United States Patent
Singleton, IV et al.

(10) Patent No.: US 10,862,975 B1
(45) Date of Patent: Dec. 8, 2020

(54) COMPUTING SYSTEM PROVIDING DIRECT ROUTING FOR DESKTOP AS A SERVICE (DAAS) SESSIONS TO A PRIVATE NETWORK AND RELATED METHODS

(71) Applicant: CITRIX SYSTEMS, INC., Fort Lauderdale, FL (US)

(72) Inventors: Leo C. Singleton, IV, Fort Lauderdale, FL (US); Kenneth Bell, Sunnyvale, CA (US); Jitendra Deshpande, Parkland, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 16/430,726

(22) Filed: Jun. 4, 2019

(51) Int. Cl.
*H04L 29/08* (2006.01)
*H04L 12/46* (2006.01)
*H04L 29/06* (2006.01)

(52) U.S. Cl.
CPC ........ *H04L 67/141* (2013.01); *H04L 12/4633* (2013.01); *H04L 12/4641* (2013.01); *H04L 69/16* (2013.01)

(58) Field of Classification Search
CPC .................................................... H04L 67/141
USPC ........................................................ 709/227
See application file for complete search history.

(56) References Cited

U.S. PATENT DOCUMENTS

| | | | |
|---|---|---|---|
| 6,683,877 B1 * | 1/2004 | Gibbs | H04L 12/28 370/395.2 |
| 6,785,713 B1 | 8/2004 | Freeman et al. | |
| 7,724,657 B2 | 5/2010 | Rao et al. | |
| 7,978,714 B2 | 7/2011 | Rao et al. | |
| 8,458,222 B2 * | 6/2013 | Bobick | H04L 67/2852 707/797 |
| 8,650,299 B1 | 2/2014 | Huang et al. | |
| 8,904,477 B2 | 12/2014 | Barton et al. | |
| 8,910,112 B2 * | 12/2014 | Li | G06F 8/36 717/106 |
| 8,914,845 B2 | 12/2014 | Barton et al. | |
| 9,086,897 B2 * | 7/2015 | Oh | G06F 9/452 |
| 9,176,744 B2 | 11/2015 | Lee | |
| 9,521,117 B2 | 12/2016 | Barton et al. | |
| 9,538,345 B2 | 1/2017 | Sah et al. | |

(Continued)

FOREIGN PATENT DOCUMENTS

EP     2403207 A1    1/2012

OTHER PUBLICATIONS

Eaves et al., "Desktop as a Service Proof of Concept", 2012 (Year: 2012).*

(Continued)

*Primary Examiner* — Ondrej C Vostal
(74) *Attorney, Agent, or Firm* — Finch & Maloney PLLC

(57) ABSTRACT

A method may include establishing a first direct route to a gateway appliance from session clients each associated with a respective Desktop as a Service (DaaS) session run by a virtual session controller within a computing network, and establishing a second direct route from the gateway appliance to a virtual session connector within at least one private enterprise computing network. The method may also include relaying private enterprise network data between the session clients and the virtual session connector through the gateway appliance via the first direct route to each session client and the second direct route to the virtual session connector.

20 Claims, 7 Drawing Sheets

(56) References Cited

U.S. PATENT DOCUMENTS

| | | | |
|---|---|---|---|
| 2006/0143282 A1* | 6/2006 | Brown | G06F 16/9577 709/217 |
| 2007/0180485 A1* | 8/2007 | Dua | H04L 61/157 725/114 |
| 2008/0086564 A1* | 4/2008 | Putman | H04L 29/06 709/227 |
| 2009/0199175 A1* | 8/2009 | Keller | G06F 9/455 717/178 |
| 2015/0058969 A1 | 2/2015 | Ringdahl et al. | |
| 2015/0339136 A1 | 11/2015 | Suryanarayanan | |
| 2016/0036920 A1* | 2/2016 | Sama | H04L 63/08 709/203 |
| 2016/0183351 A1* | 6/2016 | Snyder | H04L 12/40039 315/152 |
| 2017/0099160 A1* | 4/2017 | Mithyantha | H04L 12/4641 |
| 2017/0192835 A1* | 7/2017 | Narayanan | H04L 41/06 |
| 2019/0356701 A1* | 11/2019 | Prabhu | H04L 65/60 |

OTHER PUBLICATIONS

International Search Report and Written Opinion for Application No. PCT/US2020/028912 dated Jul. 1, 2020, 14 pages.

* cited by examiner

COMPUTING SYSTEM PROVIDING DIRECT ROUTING FOR DESKTOP AS A SERVICE (DAAS) SESSIONS TO A PRIVATE NETWORK AND RELATED METHODS

BACKGROUND

Traditionally, personal computers include combinations of operating systems, applications, and user settings, which are each managed individually by owners or administrators on an ongoing basis. However, many organizations are now using application and/or desktop virtualization to provide a more flexible option to address the varying needs of their users. In desktop virtualization, a user's computing environment (e.g., operating system, applications, and/or user settings) may be separated from the user's physical computing device (e.g., smartphone, laptop, desktop computer). Using client-server technology, a "virtualized desktop" may be stored in and administered by a remote server, rather than in the local storage of the client computing device.

There are several different types of desktop virtualization systems. As an example, Virtual Desktop Infrastructure (VDI) refers to the process of running a user desktop inside a virtual machine that resides on a server. VDI and other server-based desktop virtualization systems may provide personalized desktops for each user, while allowing for centralized management and security. Servers in such systems may include storage for virtual desktop images and system configuration information, as well as software components to provide the virtual desktops and allow users to interconnect to them. For example, a VDI server(s) may include one or more hypervisors (virtual machine managers) to create and maintain multiple virtual machines, software to manage the hypervisor(s), a connection broker, and software to provision and manage the virtual desktops. In some embodiments, a VDI server(s) may provide access to shared server-based hosted applications, as well as Web/Software-as-a-Service (SaaS) applications.

Desktop virtualization systems may be implemented using a single virtualization server or a combination of servers interconnected as a server grid. For example, a cloud computing environment, or cloud system, may include a pool of computing resources (e.g., desktop virtualization servers), storage disks, networking hardware, and other physical resources that may be used to provision virtual desktops, and/or provide access to shared applications, along with additional computing devices to provide management and customer portals for the cloud system. In some implementations, Desktop as a Service (DaaS) sessions may be run from a cloud computing environment for different tenants or enterprises.

SUMMARY

A method may include establishing a first direct route to a gateway appliance from session clients each associated with a respective Desktop as a Service (DaaS) session run by a virtual session controller within a computing network, and establishing a second direct route from the gateway appliance to a virtual session connector within at least one private enterprise computing network. The method may also include relaying private enterprise network data between the session clients and the virtual session connector through the gateway appliance via the first direct route to each session client and the second direct route to the virtual session connector.

In one example implementation, relaying may comprise relaying the private enterprise network data over the first and second routes via Transmission Control Protocol (TCP). In another example implementation, the session client may comprise a virtual private network (VPN) client. In some implementations, the private enterprise computing network may comprise a plurality thereof, and the virtual session connector may comprise a respective virtual session connector for each of the private enterprise computing networks. As such, the method may further include providing, from the virtual session controller to each of the session clients, a token associated with a respective private enterprise network the corresponding DaaS session is permitted to access, and creating tunnels to the gateway appliance from the session clients for accessing the respective private enterprise networks based upon the tokens.

In an example embodiment, the DaaS sessions may be further configured to communicate internet requests via the first direct route to the gateway appliance, and the method may further include routing the internet requests from the gateway appliance to the internet and without sending them to the virtual session connector. By way of example, the gateway appliance may comprise a cloud computing gateway appliance.

A related non-transitory computer-readable medium may include computer-executable instructions for causing a gateway appliance to perform steps including establishing a first direct route to session clients each associated with a DaaS session run by a virtual session controller within a computing network, and establishing a second direct route to a virtual session connector within at least one private enterprise computing network. A further step may include relaying private enterprise network data between the session clients and the virtual session connector via a first direct route to each session client and a second direct route to the virtual session connector.

A related computing system may include a virtual session connector associated with a private enterprise computing network, and a virtual session controller configured to run a plurality of DaaS sessions within a computing network, with each of the DaaS sessions comprising a session client. The system may further include a gateway appliance configured to relay private enterprise network data between the session clients and the virtual session connector via a first direct route to each session client and a second direct route to the virtual session connector.

DETAILED DESCRIPTION

Generally speaking, the system and methods described herein relate to an approach for providing remote access to private enterprise network data by Desktop as a Service (DaaS) sessions which are hosted apart from the private enterprise network (e.g., in a cloud computing environment). The present approach advantageously provides network connectivity between a public cloud and private enterprise data center using a direct routing approach through a gateway appliance, thereby avoiding the need for more complicated and costly tenant cloud accounts and/or separate network pipe configurations.

The present description is made with reference to the accompanying drawings, in which example embodiments are shown. However, many different embodiments may be used, and thus the description should not be construed as limited to the particular embodiments set forth herein. Like numbers refer to like elements throughout.

As will be appreciated by one of skill in the art upon reading the following disclosure, various aspects described herein may be embodied as a device, a method or a computer program product (e.g., a non-transitory computer-readable medium having computer executable instruction for performing the noted operations or steps). Accordingly, those aspects may take the form of an entirely hardware embodiment, an entirely software embodiment, or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

Figure 1:
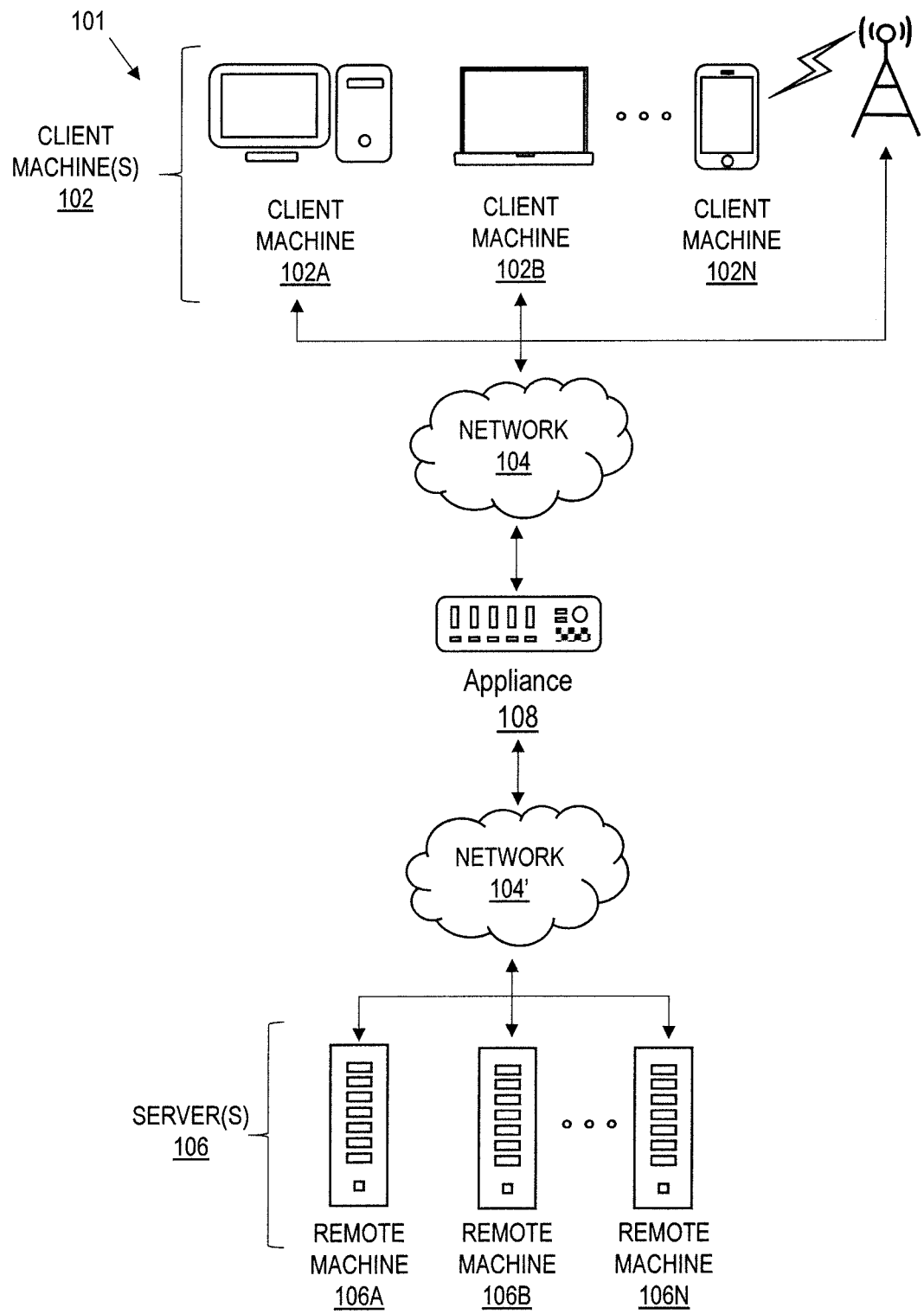
FIG. 1 is a schematic block diagram of a network environment of computing devices in which various aspects of the disclosure may be implemented.

Referring initially to FIG. 1, a non-limiting network environment 101 in which various aspects of the disclosure may be implemented includes one or more client machines 102A-102N, one or more remote machines 106A-106N, one or more networks 104, 104', and one or more appliances 108 installed within the computing environment 101. The client machines 102A-102N communicate with the remote machines 106A-106N via the networks 104, 104'.

In some embodiments, the client machines 102A-102N communicate with the remote machines 106A-106N via an intermediary appliance 108. The illustrated appliance 108 is positioned between the networks 104, 104' and may also be referred to as a network interface or gateway. In some embodiments, the appliance 108 may operate as an application delivery controller (ADC) to provide clients with access to business applications and other data deployed in a datacenter, the cloud, or delivered as Software as a Service (SaaS) across a range of client devices, and/or provide other functionality such as load balancing, etc. In some embodiments, multiple appliances 108 may be used, and the appliance(s) 108 may be deployed as part of the network 104 and/or 104'.

The client machines 102A-102N may be generally referred to as client machines 102, local machines 102, clients 102, client nodes 102, client computers 102, client devices 102, computing devices 102, endpoints 102, or endpoint nodes 102. The remote machines 106A-106N may be generally referred to as servers 106 or a server farm 106.

In some embodiments, a client device 102 may have the capacity to function as both a client node seeking access to resources provided by a server 106 and as a server 106 providing access to hosted resources for other client devices 102A-102N. The networks 104, 104' may be generally referred to as a network 104. The networks 104 may be configured in any combination of wired and wireless networks.

A server 106 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 106 may execute a remote presentation services program or other program that uses a thin-client or a remote-display protocol to capture display output generated by an application executing on a server 106 and transmit the application display output to a client device 102.

In yet other embodiments, a server 106 may execute a virtual machine providing, to a user of a client device 102, access to a computing environment. The client device 102 may be a virtual machine. The virtual machine may be managed by, for example, a hypervisor, a virtual machine manager (VMM), or any other hardware virtualization technique within the server 106.

In some embodiments, the network 104 may be: a local-area network (LAN); a metropolitan area network (MAN); a wide area network (WAN); a primary public network 104; and a primary private network 104. Additional embodiments may include a network 104 of mobile telephone networks that use various protocols to communicate among mobile devices. For short range communications within a wireless local-area network (WLAN), the protocols may include 802.11, Bluetooth, and Near Field Communication (NFC).

Figure 2:
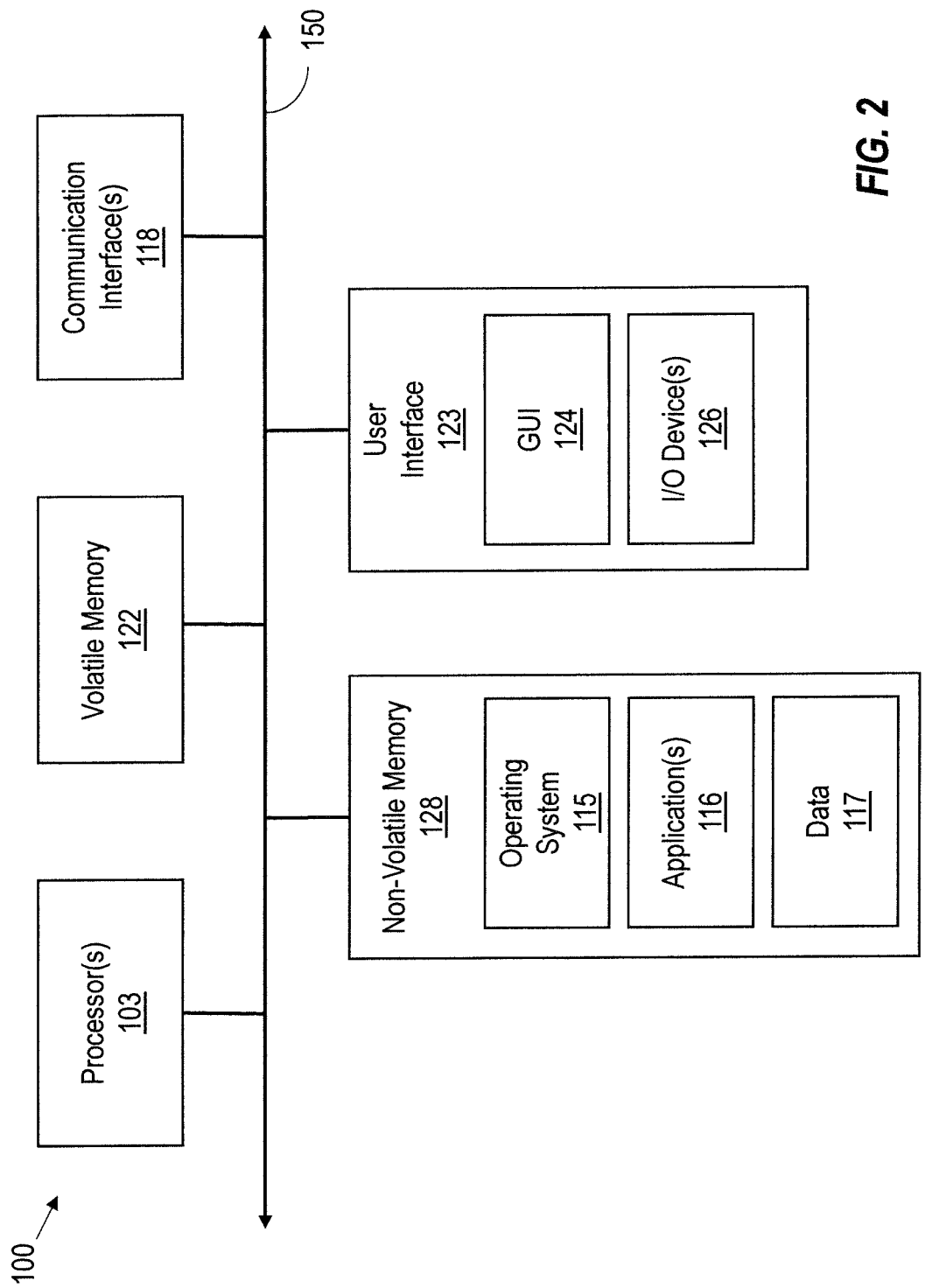
FIG. 2 is a schematic block diagram of a computing device useful for practicing an embodiment of the client machines or the remote machines illustrated in FIG. 1.

FIG. 2 depicts a block diagram of a computing device 100 useful for practicing an embodiment of client devices 102, appliances 108 and/or servers 106. The computing device 100 includes one or more processors 103, volatile memory 122 (e.g., random access memory (RAM)), non-volatile memory 128, user interface (UI) 123, one or more communications interfaces 118, and a communications bus 150.

The non-volatile memory 128 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 123 may include a graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, and one or more accelerometers, etc.).

The non-volatile memory 128 stores an operating system 115, one or more applications 116, and data 117 such that, for example, computer instructions of the operating system 115 and/or the applications 116 are executed by processor(s) 103 out of the volatile memory 122. In some embodiments, the volatile memory 122 may include one or more types of RAM and/or a cache memory that may offer a faster response time than a main memory. Data may be entered using an input device of the GUI 124 or received from the I/O device(s) 126. Various elements of the computer 100 may communicate via the communications bus 150.

The illustrated computing device 100 is shown merely as an example client device or server, and may be implemented by any computing or processing environment with any type of machine or set of machines that may have suitable hardware and/or software capable of operating as described herein.

The processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor 103 may be analog, digital or mixed-signal. In some embodiments, the processor 103 may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 118 may include one or more interfaces to enable the computing device 100 to access a computer network such as a Local Area Network (LAN), a Wide Area Network (WAN), a Personal Area Network (PAN), or the Internet through a variety of wired and/or wireless connections, including cellular connections.

In described embodiments, the computing device 100 may execute an application on behalf of a user of a client device. For example, the computing device 100 may execute one or more virtual machines managed by a hypervisor. Each virtual machine may provide an execution session within which applications execute on behalf of a user or a client device, such as a hosted desktop session. The computing device 100 may also execute a terminal services session to provide a hosted desktop environment. The computing device 100 may provide access to a remote computing environment including one or more applications, one or more desktop applications, and one or more desktop sessions in which one or more applications may execute.

Additional descriptions of a computing device 100 configured as a client device 102 or as a server 106, or as an appliance intermediary to a client device 102 and a server 106, and operations thereof, may be found in U.S. Pat. Nos. 9,176,744 and 9,538,345, which are incorporated herein by reference in their entirety. The '744 and '345 patents are both assigned to the current assignee of the present disclosure.

Figure 3:
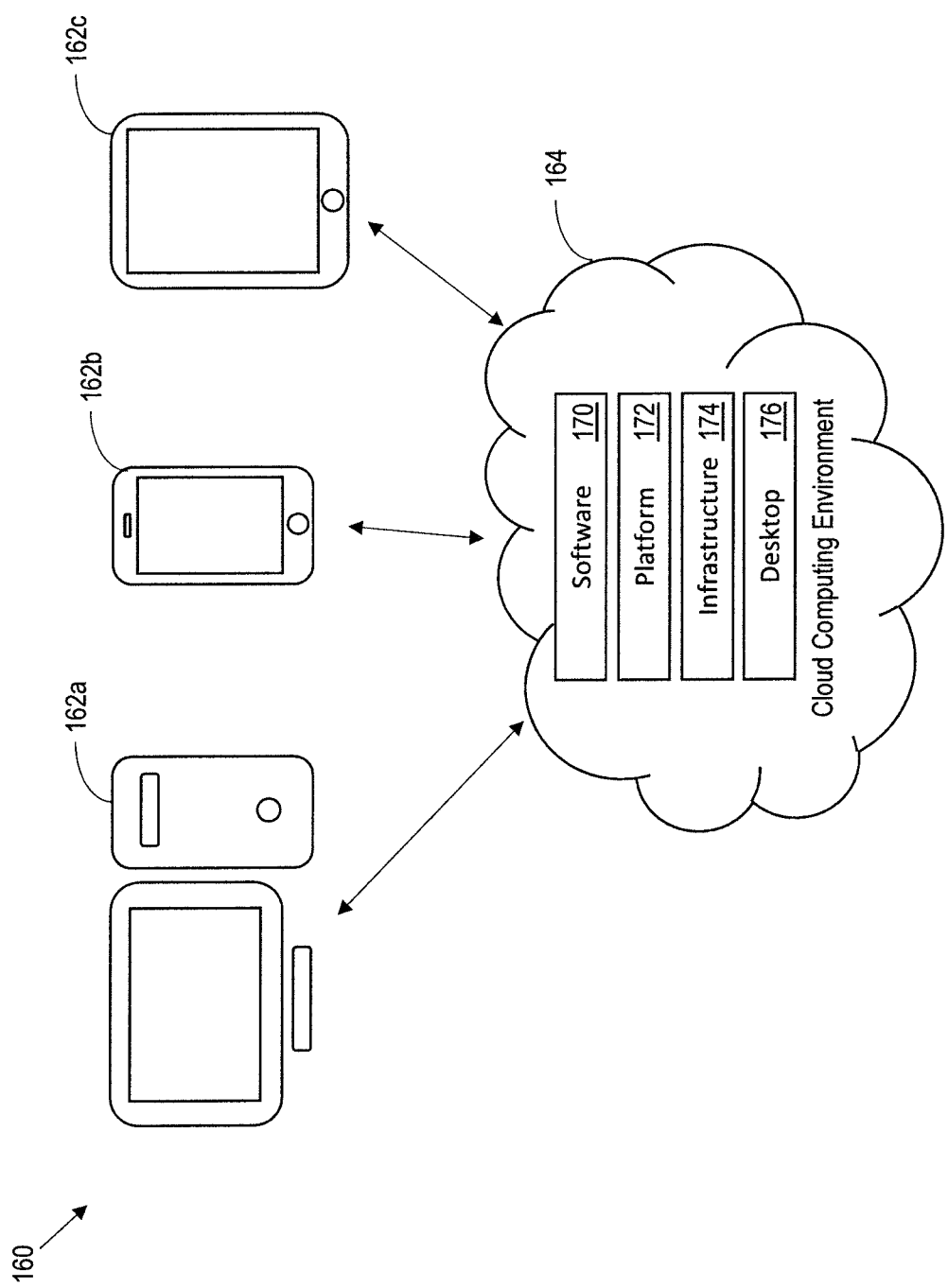
FIG. 3 is a schematic block diagram of a cloud computing environment in which various aspects of the disclosure may be implemented.

Referring to FIG. 3, a cloud computing environment 160 is depicted, which may also be referred to as a cloud environment, cloud computing or cloud network. The cloud computing environment 160 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 160, one or more clients 162a-162c (such as those described above) are in communication with a cloud network 164. The cloud network 164 may include back end platforms, e.g., servers, storage, server farms or data centers. The users or clients 162a-162c can correspond to a single organization/tenant or multiple organizations/tenants. More particularly, in one example implementation the cloud computing environment 160 may provide a private cloud serving a single organization (e.g., enterprise cloud). In another example, the cloud computing environment 160 may provide a community or public cloud serving multiple organizations/tenants. In still further embodiments, the cloud computing environment 160 may provide a hybrid cloud that is a combination of a public cloud and a private cloud. Public clouds may include public servers that are maintained by third parties to the clients 162a-162c or the enterprise/tenant. The servers may be located off-site in remote geographical locations or otherwise.

The cloud computing environment 160 can provide resource pooling to serve multiple users via clients 162a-162c through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 160 can provide on-demand self-service to unilaterally provision computing capabilities (e.g., server time, network storage) across a network for multiple clients 162a-162c. The cloud computing environment 160 can provide an elasticity to dynamically scale out or scale in responsive to different demands from one or more clients 162. In some embodiments, the computing environment 160 can include or provide monitoring services to monitor, control and/or generate reports corresponding to the provided shared services and resources.

In some embodiments, the cloud computing environment 160 may provide cloud-based delivery of different types of cloud computing services, such as Software as a service (SaaS) 170, Platform as a Service (PaaS) 172, Infrastructure as a Service (IaaS) 174, and Desktop as a Service (DaaS) 176, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Similar to SaaS, DaaS (which is also known as hosted desktop services) is a form of virtual desktop infrastructure (VDI) in which virtual desktop sessions are typically delivered as a cloud service along with the apps used on the virtual desktop. CITRIX CLOUD is one example of a DaaS delivery platform. DaaS delivery platforms may be hosted on a public cloud computing infrastructure such as AZURE CLOUD from Microsoft Corporation of Redmond, Wash. (herein "Azure"), or AMAZON WEB SERVICES provided by Amazon.com, Inc., of Seattle, Wash. (herein "AWS"), for example.

Figure 4:
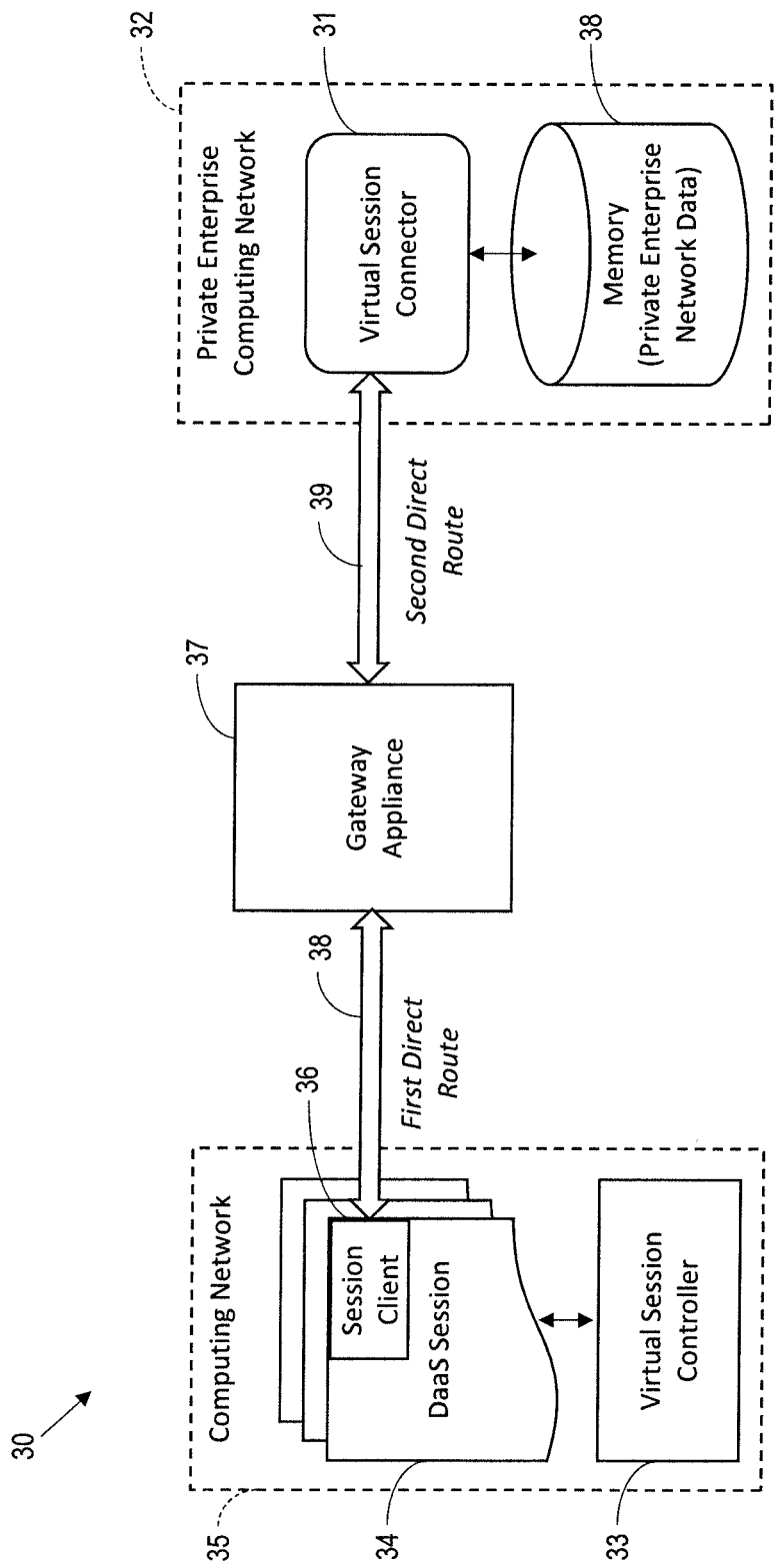
FIG. 4 is a schematic block diagram illustrating a system for providing Desktop as a Service (DaaS) sessions on a computing network that retain secure access to private enterprise network data in accordance with an example embodiment.

Turning to FIG. 4, a computing system 30 is now described which may provide remote (e.g., off-premises) DaaS services (e.g., cloud-based DaaS services), yet while retaining access to private (e.g., on-premises or on-prem) network data centers without a need for complicated and costly tenant cloud accounts and/or separate network pipe configurations. By way of background, with typical DaaS sessions hosted in a cloud service such as Azure or AWS, it can be difficult to allow the cloud-based DaaS sessions to securely access private network data that is maintained on-prem without costly and/or complicated infrastructure in place. For example, a tenant or enterprise utilizing DaaS sessions in Azure through a third-party provider may still have to maintain an individual Azure customer account in order to establish an express route back to the on-prem data center, which results in added cost and maintenance for the customer. Other approaches to accessing private on-prem resources (e.g., Exchange data, documents, databases, etc.) include establishing a site-to-site virtual private network (VPN) connection from the cloud provider to the private network, which again may be complicated and require leasing of relatively costly network pipes in some cases. Furthermore, these approaches may also involve relatively complicated network configuration changes and/or network routing changes, as well as updating of routing tables.

The system 30 illustratively includes a virtual session connector 31 associated with a private enterprise computing network 32 (e.g., an on-prem network). The virtual session connector 31 may be implemented as a software module and/or appliance installed on the private enterprise computing network 32. Furthermore, a virtual session controller 33 is configured to run a plurality of DaaS sessions 34 within a computing network 35, such as a cloud computing network, for example, although other computing networks may also be used in different implementations.

Furthermore, each of the DaaS sessions 34 has a respective session client 36 associated therewith. The system 30 also illustratively includes a gateway appliance 37 configured to relay private enterprise network data (which may be stored in one or more network memories or databases 38) between the session clients 36 and the virtual session connector 31 via a first direct route 38 to each session client, and a second direct route 39 to the virtual session connector. In some implementations, the gateway appliance 37 may be implemented as an on-prem gateway appliance, such as a Citrix Gateway server. However, in other implementations, the gateway appliance may be implanted as part of a cloud-based gateway service, such as Citrix Gateway Service, although other suitable gateway appliances may be used in different embodiments.

Figure 5:
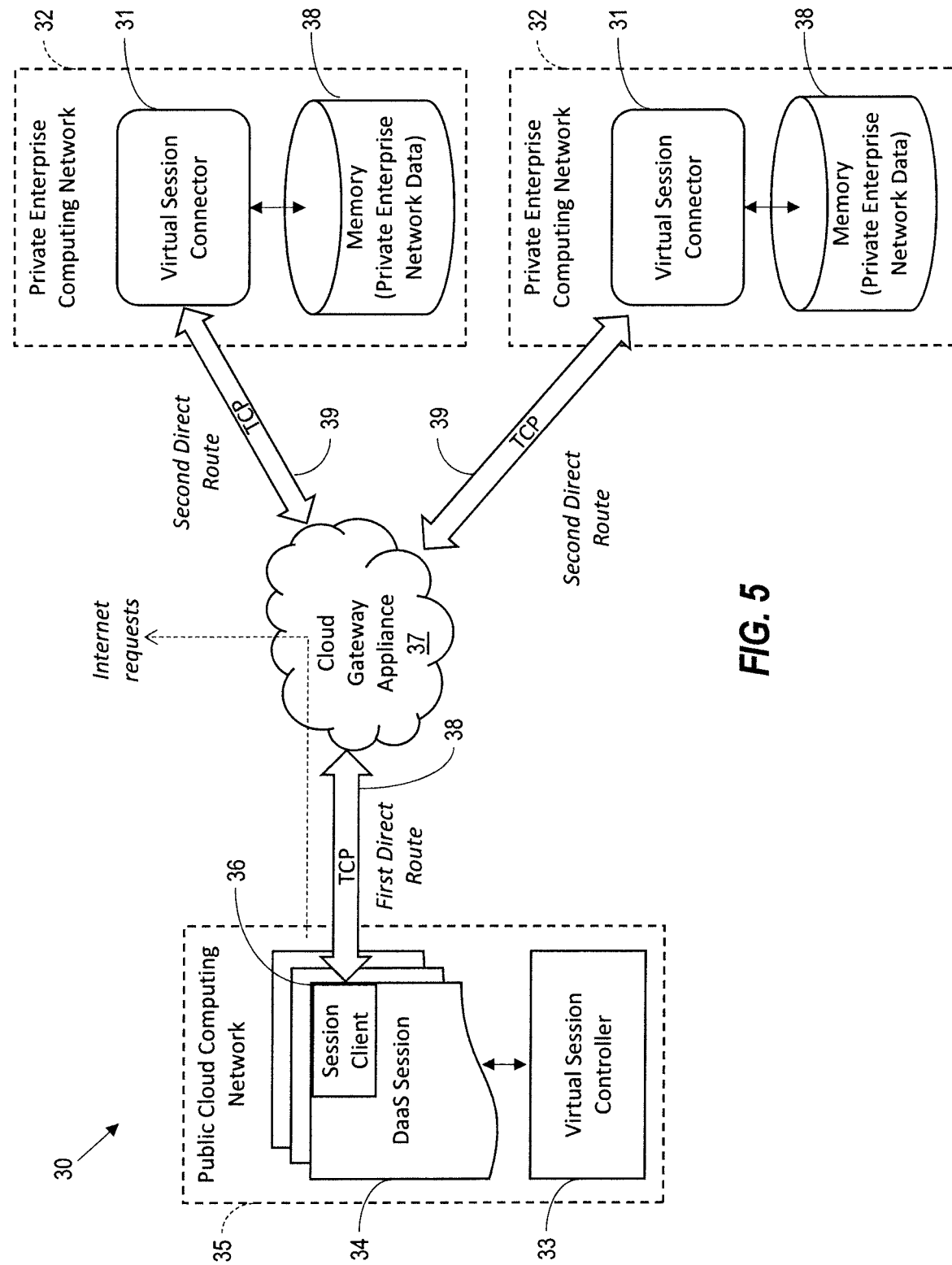
FIG. 5 is a schematic block diagram of an example implementation of the system of FIG. 4 in which the DaaS sessions are hosted in a cloud computing network.
Figure 6:
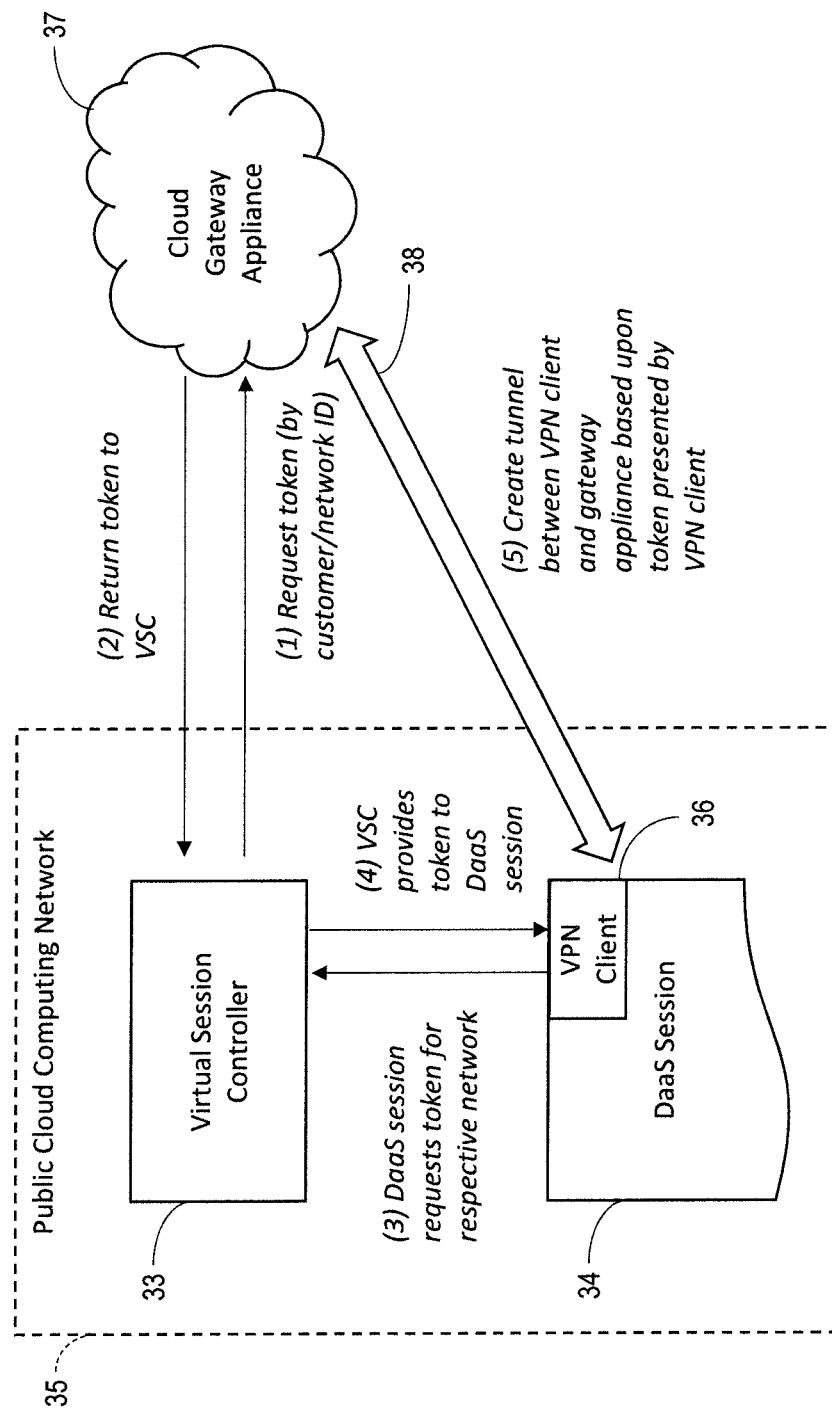
FIG. 6 is a schematic block diagram illustrating a token authentication approach which may be used in the system of FIG. 5.

Referring additionally to FIGS. 5 and 6, in this example implementation of the system 30 the computing network 35 is a public cloud computing network which runs DaaS sessions for multiple private enterprise computing networks 32, each of which corresponds to a different respective enterprise (e.g., a corporate or government entity). Moreover, each private enterprise computing network 32 also has its own respective virtual session connector 31. The virtual session connectors 31 may reach outbound via the internet to the gateway appliance 37 (which in this example is implemented as a cloud gateway service) over HTTPS, for example. As such, no inbound ports or public IP addresses are required to install the virtual session connectors 31, which may in turn communicate with other private enterprise computing network 32 components via direct routing (e.g., using TCP). The virtual session connectors 31 may advantageously perform network address translators (NAT) for inbound traffic for the respective private enterprise network 32, and as a result no routing changes are required on the internal network.

Furthermore, the DaaS sessions 34 are each associated with a respective private enterprise computing network 32 and will only be able to access the private enterprise network data associated with that network, as will be discussed further below. In the illustrated example, the respective private enterprise network data is relayed over the first and second routes 38, 39 via Transmission Control Protocol (TCP). That is, TCP is used to create the direct channels or routes 38, 39 from the gateway appliance 37 to the session clients 36 and the virtual session connector 31, respectively. TCP also manages how messages are assembled into packets before they are then transmitted and reassembled in the correct order at the destination address. However, other approaches for direct routing may be used in different embodiments.

Also in the illustrated example, the session clients 36 are virtual private network (VPN) clients. More particularly, a Windows VPN client may be installed on each of the DaaS desktops 34, such that no additional VPN hardware is needed in the public cloud computing network 35, which helps reduce cloud computing costs. Moreover, the gateway appliance 37 may advantageously implement a "full tunnel"

protocol via TCP, etc., as noted above, to leverage the Windows VPN client and add full tunnel protocol support for providing the direct routes 38, 39 for private enterprise network communications.

To configure the DaaS sessions 34 for communication with their respective private enterprise computing networks 32, the virtual session controller 33 initially requests a token for each of the private enterprise networks (i.e., for each enterprise or tenant) from the gateway appliance 37, which again in this example is implemented in a cloud-based gateway service. The gateway appliance 37 generates a respective secure token or key for each of the private enterprise computing networks 32 and returns them to the virtual session controller 33 in the cloud computing network. Then, when a DaaS session 34 is initiated, the VPN session client 36 requests the enterprise token for the respective private enterprise computing network 32 from the virtual session controller 33. Upon receiving the respective enterprise token for the DaaS session 34, the VPN session client 36 may then communicate with the gateway appliance 37 to create the tunnel 38 to the gateway appliance based upon the enterprise token, which was generated by the gateway appliance and therefore already known to it. As such, direct routing of private enterprise data may then commence over the tunnel 38, as noted above. In the case of Citrix Gateway Service (NGS), provisioning of the key for the VPN client 36 to use for authentication to NGS may be performed by Citrix XenApp or XenDesktop provisioning services, for example, although different provisioning services or approaches may be used in different embodiments. The system 30 accordingly provides for a key-based authentication handshake to the gateway appliance 37 to establish VPN tunnels as a known tenant.

Furthermore, in addition to sending and/or receiving private enterprise network data, the DaaS sessions 34 will also send internet traffic to other sources which are not part of the private enterprise computing network 32. As such, while this other traffic may also pass from the DaaS sessions 34 to the gateway appliance 37 via the first direct route 38, passing such traffic along to the private enterprise computing network 32 to then re-direct to other internet sources may not only burden the computing resources of the private enterprise network, it may also add latency. As such, the gateway appliance 37 may also advantageously be configured to route internet requests received from the DaaS sessions 34 via the first direct route 38 to the internet and without sending them to the virtual session connector 31 over the second route 39. In one example implementation, the gateway appliance may also include a client or component (e.g., a VPN client) that causes such HTTP/HTTPS traffic to be filtered through a Secure Web Gateway appliance or service, such as Citrix Secure Web Gateway (SWG), for example, and then out to internet, although other approaches for routing of internet traffic may also be used in different embodiments.

Moreover, in some embodiments the VPN session client 36 may also utilize a routing document (policy-based routing) to determine which traffic will be allowed to egress directly to the internet without traversing the first direct route 38 to the gateway appliance 37. This may advantageously allow Web or SaaS apps running on the DaaS sessions 34 to continue to work as designed without compromising their communications, and allowing these communications to be sent to known trusted Web/SaaS applications by the fastest route possible (e.g., by a direct route where possible).

Figure 7:
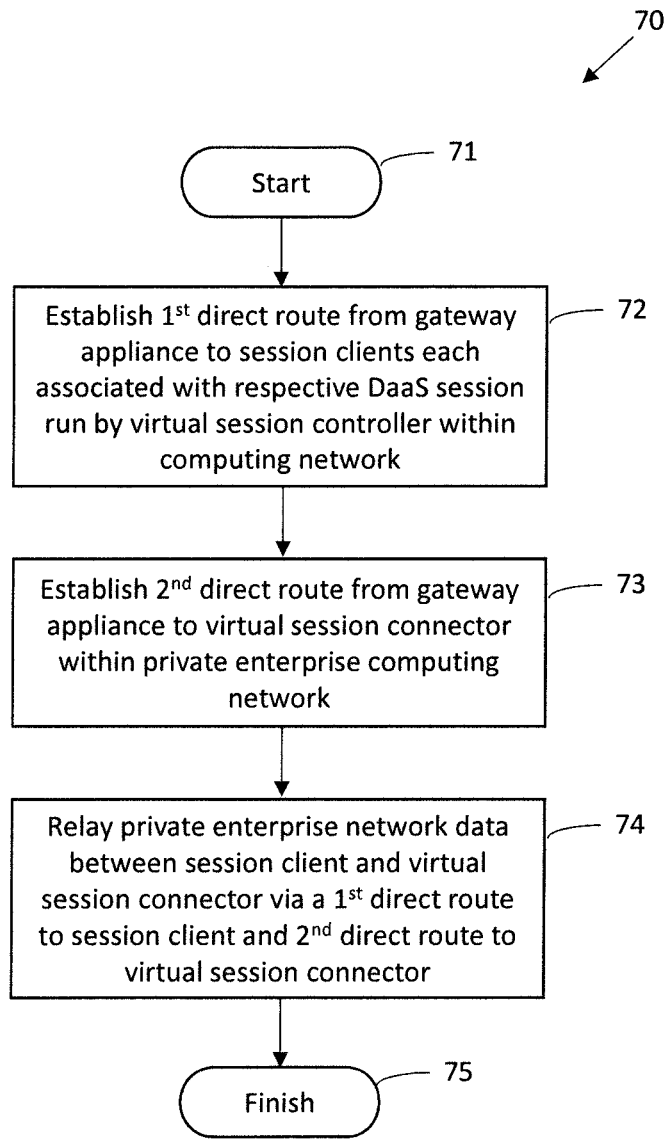
FIG. 7 is a flow diagram illustrating method aspects associated with the system of FIG. 4.

Turning now to the flow diagram 70 of FIG. 7, beginning at Block 71, a related method illustratively includes establishing a first direct route 38 to the gateway appliance 37 from the session clients 36, at Block 72, and establishing a second direct route 39 from the gateway appliance to the virtual session connector 31 within the private enterprise computing network 32, at Block 73. The method further illustratively includes relaying private enterprise network data between the session clients 36 and the virtual session connector 31 through the gateway appliance 37 via the first direct route 38 to each session client and the second direct route 39 to the virtual session connector (Block 74), as discussed further above. The method of FIG. 7 illustratively concludes at Block 75.

Many modifications and other embodiments will come to the mind of one skilled in the art having the benefit of the teachings presented in the foregoing descriptions and the associated drawings. Therefore, it is understood that the foregoing is not to be limited to the example embodiments, and that modifications and other embodiments are intended to be included within the scope of the appended claims.

That which is claimed is:

1. A method comprising:
   establishing a first direct route to a gateway appliance from session clients each associated with a respective Desktop as a Service (DaaS) session run by a virtual session controller within a computing network;
   establishing a second direct route from the gateway appliance to a virtual session connector within at least one private enterprise computing network; and
   relaying private enterprise network data between the session clients and the virtual session connector through the gateway appliance via the first direct route to each session client and the second direct route to the virtual session connector.

2. The method of claim 1, wherein relaying comprises relaying the private enterprise network data over the first and second routes via Transmission Control Protocol (TCP).

3. The method of claim 1, wherein the session client comprises a virtual private network (VPN) client.

4. The method of claim 1, wherein the at least one private enterprise computing network comprises a plurality thereof, and the virtual session connector comprises a respective virtual session connector for each of the private enterprise computing networks.

5. The method of claim 4, wherein the virtual session controller provides to each of the session clients a token associated with a respective private enterprise network the associated DaaS session is permitted to access; and further comprising creating tunnels from the gateway appliance to the session clients for accessing the respective private enterprise networks based upon the tokens.

6. The method of claim 1, wherein the DaaS sessions are further configured to communicate internet requests via the first direct route to the gateway appliance; and further comprising routing the internet requests from the gateway appliance to the internet and without sending them to the virtual session connector.

7. The method of claim 1, wherein the gateway appliance comprises a cloud computing gateway appliance.

8. A non-transitory computer-readable medium having computer-executable instructions for causing a gateway appliance to perform steps comprising:
   establishing a first direct route to session clients each associated with a respective Desktop as a Service (DaaS) session run by a virtual session controller within a computing network;

establishing a second direct route to a virtual session connector within at least one private enterprise computing network; and relaying private enterprise network data between the session clients and the virtual session connector via a first direct route to each session client and a second direct route to the virtual session connector.

9. The non-transitory computer-readable medium of claim 8 wherein relaying comprises relaying the private enterprise network data over the first and second routes via Transmission Control Protocol (TCP).

10. The non-transitory computer-readable medium of claim 8, wherein the session client comprises a virtual private network (VPN) client.

11. The non-transitory computer-readable medium of claim 8, wherein the at least one private enterprise computing network comprises a plurality thereof, and the virtual session connector comprises a respective virtual session connector for each of the private enterprise computing networks.

12. The non-transitory computer-readable medium of claim 11, wherein the virtual session controller is configured to provide each of the session clients a token associated with a respective private enterprise network the associated DaaS session is permitted to access; and further having computer-executable instructions for causing the gateway appliance to create tunnels to the session clients for accessing the respective private enterprise networks based upon the tokens.

13. The non-transitory computer-readable medium of claim 8, wherein the DaaS sessions are further configured to communicate internet requests via the first direct route to the gateway appliance; and further having computer-executable instructions for causing the gateway appliance to route the internet requests to the internet and without sending them to the virtual session connector.

14. The non-transitory computer-readable medium of claim 8, wherein the gateway appliance comprises a cloud computing gateway appliance.

15. A computing system comprising:
a virtual session connector associated with one or more private enterprise computing networks;
a virtual session controller configured to run a plurality of Desktop as a Service (DaaS) sessions within a computing network, each of the DaaS sessions comprising a session client; and
a gateway appliance configured to relay private enterprise network data between the session clients and the virtual session connector via a first direct route to each session client and a second direct route to the virtual session connector.

16. The computing system of claim 15, wherein the gateway appliance relays the private enterprise network data over the first and second routes via Transmission Control Protocol (TCP).

17. The computing system of claim 15, wherein the session client comprises a virtual private network (VPN) client.

18. The computing system of claim 15, wherein the one or more private enterprise computing networks comprise a plurality thereof, and the virtual session connector comprises a respective virtual session connector for each of the private enterprise computing networks.

19. The computing system of claim 18 wherein the virtual session controller is configured to provide each of the session clients a token associated with a respective private enterprise network the associated DaaS session is permitted to access; and wherein the gateway appliance is configured to create tunnels to the session clients for accessing the respective private enterprise networks based upon the tokens.

20. The computing system of claim 15, wherein the DaaS sessions are further configured to communicate internet requests via the first direct route to the gateway appliance, and wherein the gateway appliance is configured to route the internet requests to the internet and without sending them to the virtual session connector.

* * * * *